May 12, 1942.
P. BERNSTEIN
2,282,541
DIRECTION AND POSITION FINDER
Filed Dec. 11, 1940
4 Sheets-Sheet 4
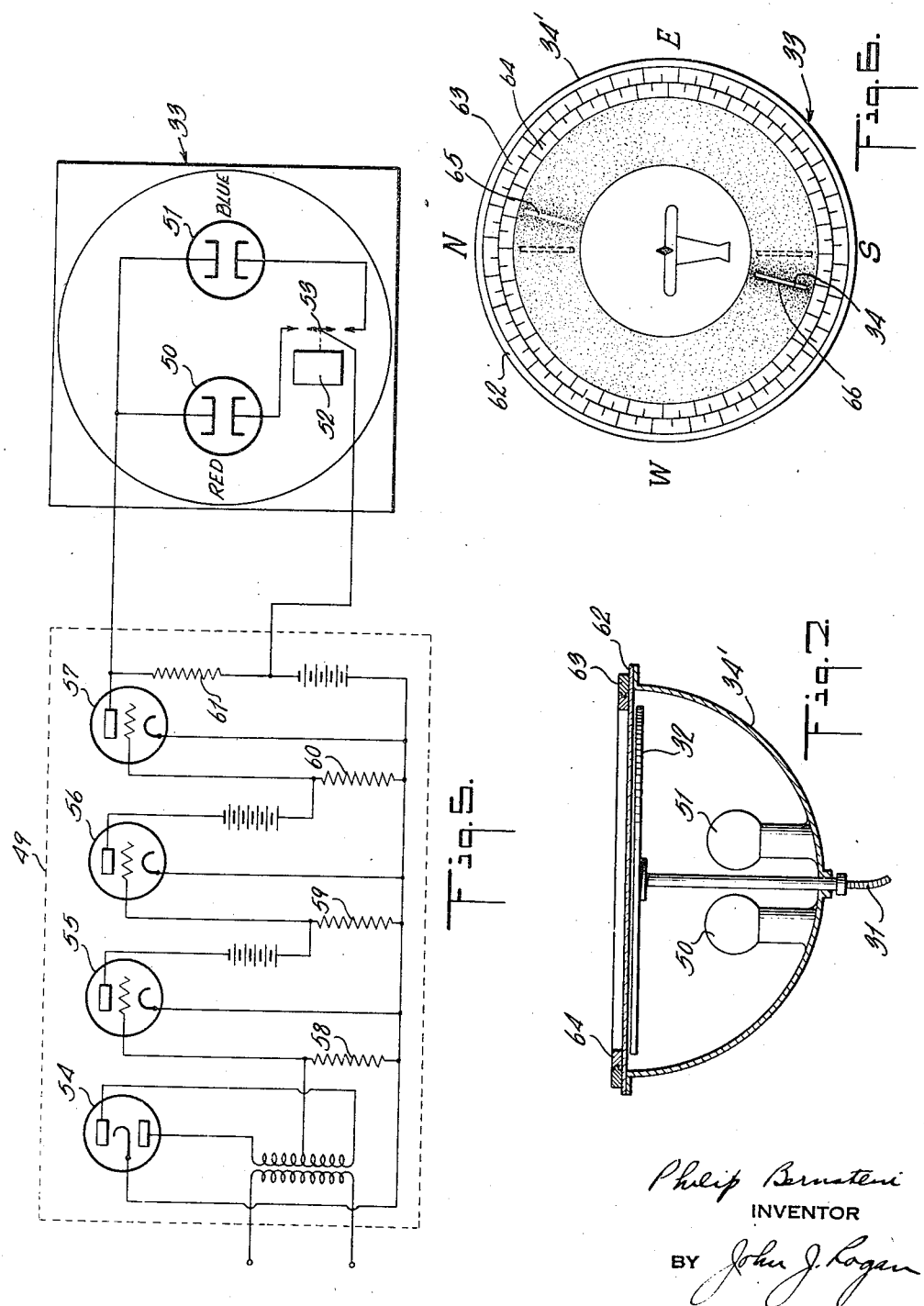
Philip Bernstein
INVENTOR
BY John J. Logan
ATTORNEY Patented May 12, 1942

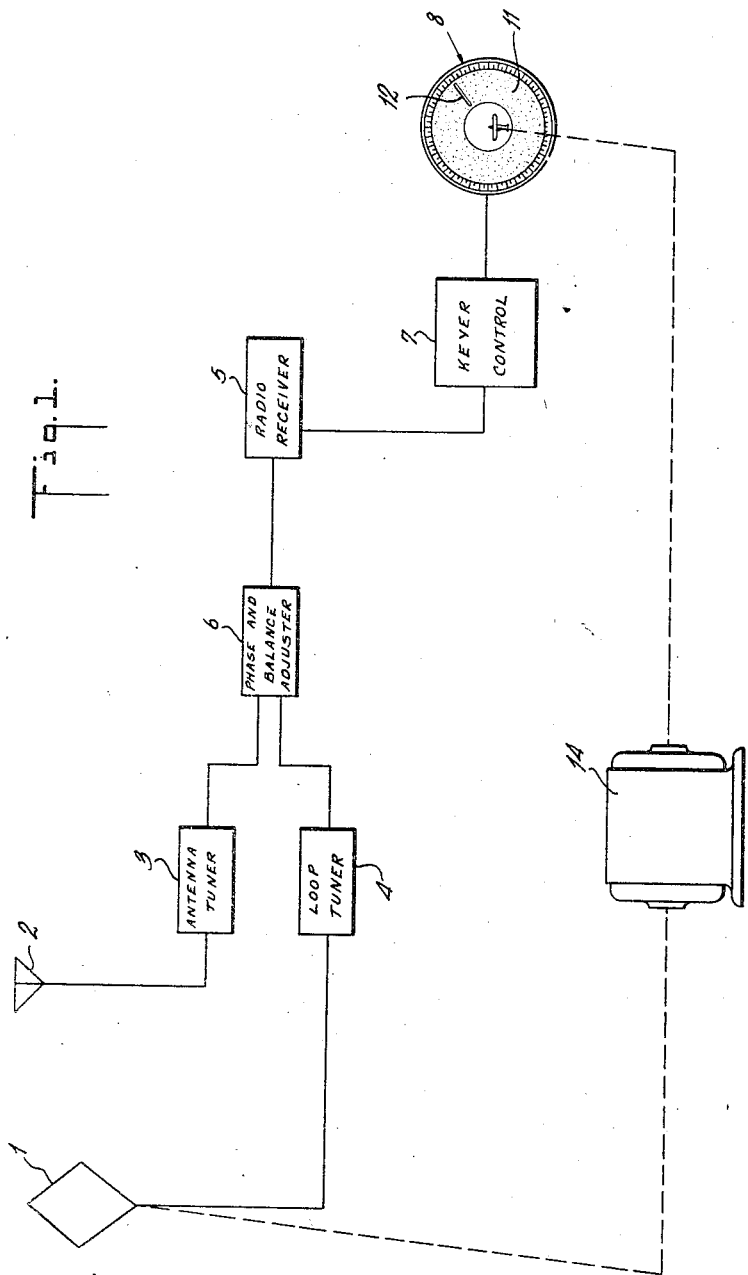

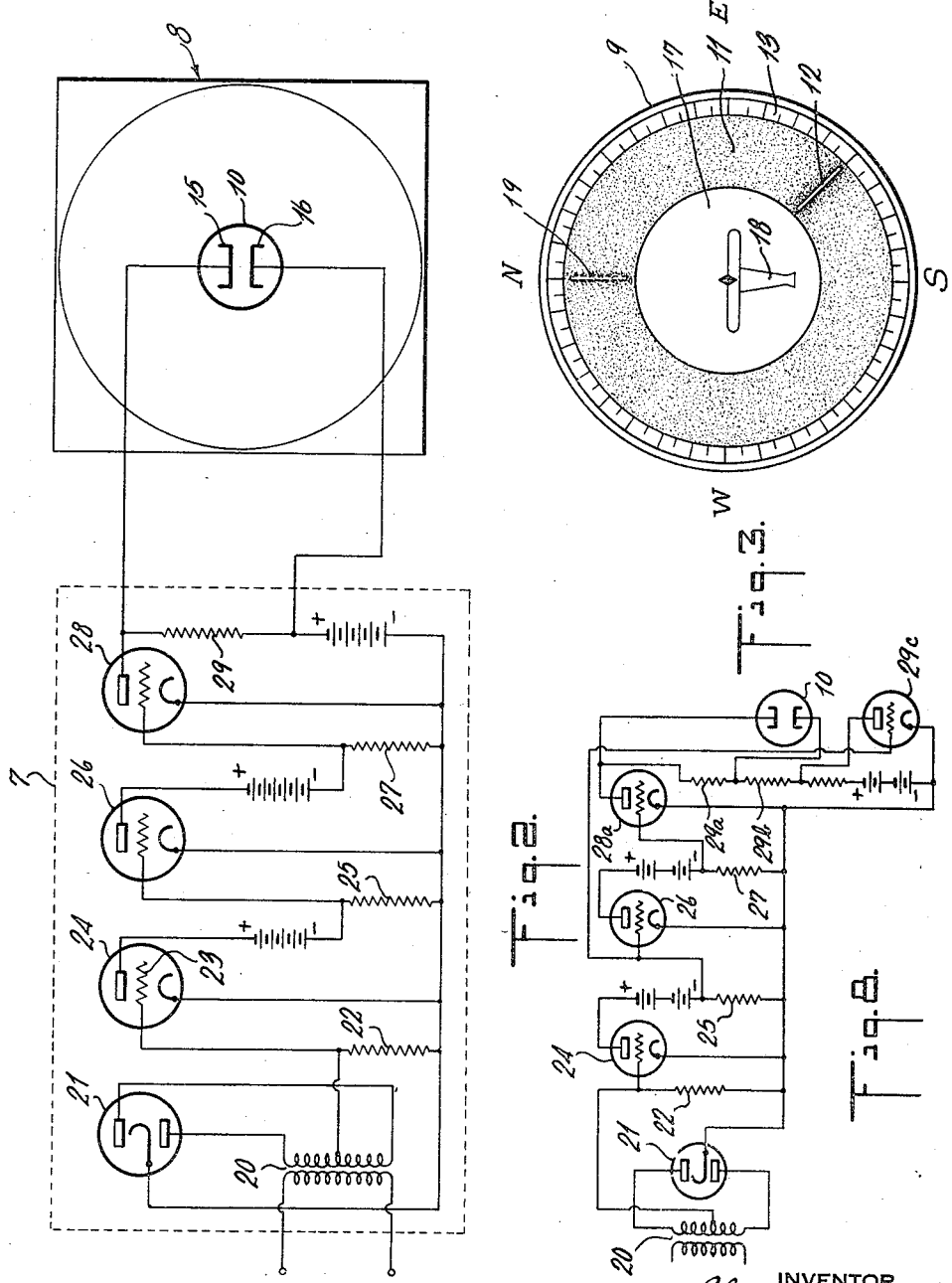

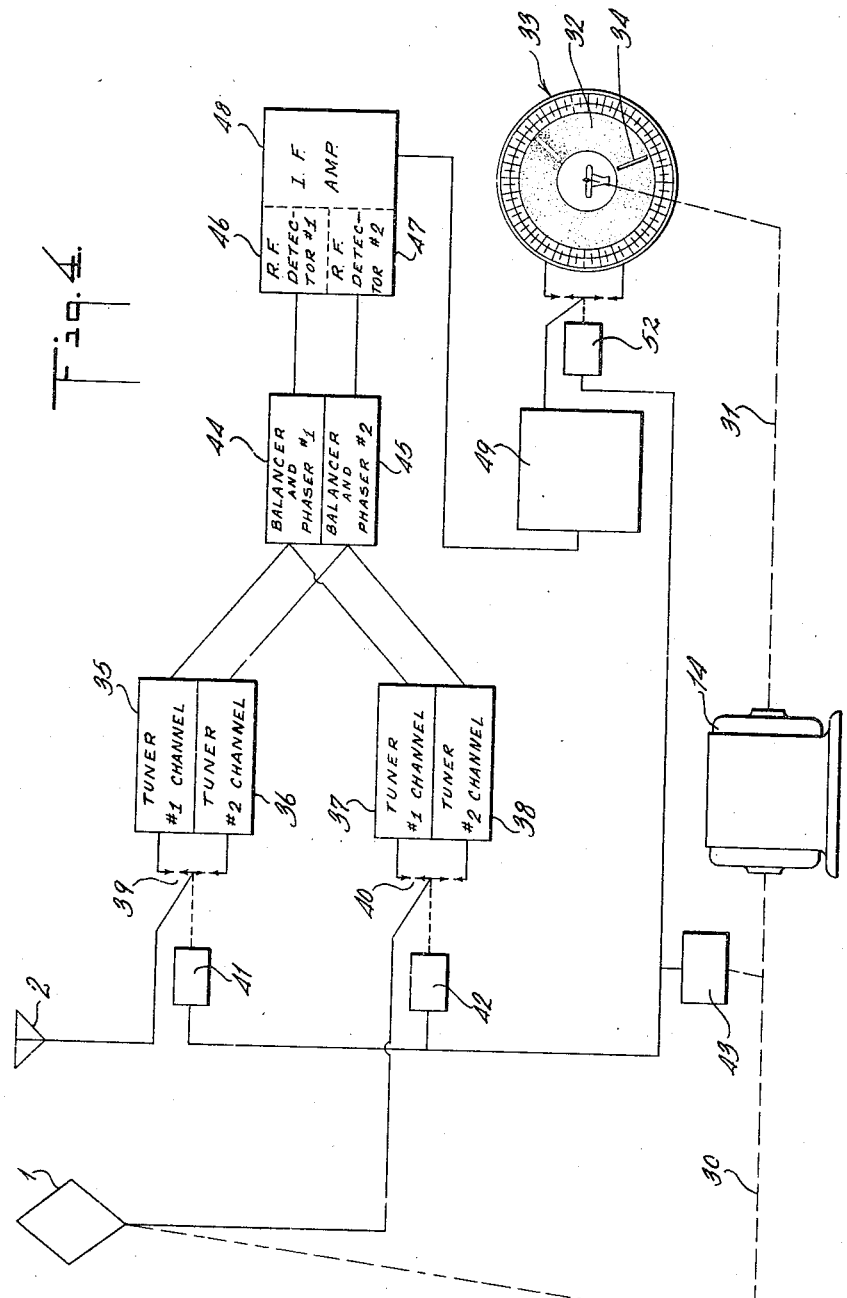

2,282,541

UNITED STATES PATENT OFFICE 2,282,541

DIRECTION AND POSITION FINDER

Philip Bernstein, Brooklyn, N. Y., assignor to Press Wireless, Inc., Chicago, Ill., a corporation of Delaware Application December 11, 1940, Serial No. 369,519

4 Claims. (Cl. 250—11)

This invention relates to direction-finding and position-finding and more particularly to methods and means for use on aircraft or other fast moving vehicles.

A principal object is to provide a direction-finding or position-indicating arrangement which is substantially instantaneous in operation so that a continuous indication is given of the direction of a marker source and of the heading of the craft with respect to said source.

Another object is to provide an improved direction or position indicator which produces an indication at sufficiently rapid intervals so as to give the effect of a continuous signal.

A further object is to provide a compact, inexpensive and reliable automatic direction and position indicator which does not require expert manipulation to ascertain direction or position.

A feature of the invention relates to a special "flash indicator" for automatically producing direct reading direction or position indications.

Another feature relates to a special "flash" keying circuit for controlling substantially instantaneously position or direction indications.

A further feature relates to the novel organization, arrangement and relative interconnection of parts which constitute a compact direct reading automatic direction indicator and direct reading position indicator.

Other features and advantages not specifically enumerated will be apparent after a consideration of the following detailed descriptions and the appended claims.

Referring to the drawings which illustrate certain preferred embodiments of the invention:

Fig. 1 is a schematic block-circuit diagram of a single channel direction indicating system according to the invention.

Fig. 2 is a detailed wiring diagram of the keying control unit of Fig. 1.

Fig. 3 is a top-plan view of the flash signal indicator unit of Figs. 1 and 2.

Fig. 4 is a schematic block diagram of a two-channel system according to the invention.

Fig. 5 is a detailed diagram of the flasher and keying control units of Fig. 4.

Fig. 6 is a top-plan view of the flasher unit of Figs. 4 and 5.

Fig. 7 is a vertical sectional view of Fig. 6.

Fig. 8 is a schematic diagram of a modified keyer control circuit.

Referring to Fig. 1 there is shown a rotatable directionally sensitive loop antenna 1 of any well-known construction such as generally used in radio direction finders. Associated with loop 1 is a non-directional vertical antenna 2 of any well-known type which cooperates with antenna 1 to provide a sense of direction indication. As is well-known in the radio direction-finding art, the two antennae cooperate to produce a null region which is in line with a suitable marker source such as a radio transmitter. For example, the two antennae may operate on the well-known Bellini-Tosi principle. When both antennae are tuned to receive waves from the marker source during one particular part of the angular rotation of the loop 1, the combined responses of the antennae balance out to produce a null, thus giving an indication of the direction of the marker source. It will be understood of course that at a suitable point on the aircraft the antenna 1 is suitably mounted for continuous rotation in close proximity to the antenna 2. For a detailed description of such an antenna arrangement, reference may be had to "Radio Engineering" by F. E. Terman, 1st edition, pages 588–591, published by McGraw-Hill Book Company. The two antennae 1 and 2 are tuned to the frequency of the marker source of radio waves by any well-known means indicated by the blocks 3 and 4. Thus these tuners may each include an adjustable condenser which can be connected to the same operating shaft as that which operates the tuning elements of the radio receiver 5.

Located between the antenna tuners and the receiver 5 is any well-known form of balancing network and phase adjusting arrangement 6 by which the signals from the two antennae can be balanced and brought into proper phase relation to produce a sharp null when the antenna 1 is facing the marker source. When the plane of loop 1 is in line with the marker source and is tuned to the frequency of the marker signal, and with antenna 2 likewise tuned to that signal, the combined signals from the two antennae will be substantially equal in amplitude but opposite in phase thus producing the null indication. As the loop 1 is rotated to any other position of its 360° orbit, a signal voltage will be impressed upon the input of receiver 5. When the loop 1 is in its null position the end of the loop closest to the marker source is referred to herein as the "front end" and is the end which indicates the sense of direction of the craft with respect to the marker.

The output of receiver 5 is applied to a flasher keying control unit 7, the circuits of which are shown in detail in Fig. 2. The keying control unit is connected to a flash indicator unit 8 which is also shown in Figs. 2 and 3. This flash indicator unit includes a housing 9 on the inside of which is mounted a gaseous discharge lamp 10. Adjacent the top transparent wall of the housing 9 is a rotatable opaque disc 11 having a radial slit 12. A compass-marked scale 13 is fixedly attached to the top of the housing to surround the disc 12.

As indicated in Fig. 1 the motor 14 rotates the antenna 1 and the disc 11 in time and phase synchronism by means of suitable flexible shafts indicated by the dotted line. The position of slot 12 therefore corresponds at any given instant to the position of the front edge of the loop 1.

The keyer control 7 is so designed that when the "front edge" of the loop is facing the marker source, a momentary flashing potential is applied across the electrodes 15, 16, of the lamp 10. Lamp 10 may be of any well-known gaseous discharge type which is substantially instantaneous in action and produces a luminous gaseous discharge when a striking voltage is applied thereto. So-called "neon" lamps may be used for this purpose. The disc 11 is rotated at a predetermined minium speed preferably not less than 12 R. P. S. so that the actual intermittent illumination of lamp 10 as viewed through the moving slit 12 causes the said slit to appear to be continuously lighted, because of the normal persistence of human vision. Consequently so long as the aircraft is not changing its heading with respect to the marker source, the illuminated slot appears to be stationary. On the other hand, if the aircraft changes its heading, there is a change in the phase relation of the loop with respect to the marker source and the illuminated slit will follow this change of angular position of the aircraft. If desired, there may be fixedly mounted above the central portion of the unit 8 a member 17 carrying an outline 18 of the aircraft and if desired another rotatable scale may surround the fixed scale 13 to assist in plotting the position of the aircraft with respect to the marker source as will be clear to those familiar with navigation procedure.

Assuming that the marker source is due north of the aircraft and the aircraft is following the due north course, then the slit appears illuminated in direct line between the aircraft 18 and the due north marking on the scale 13 as indicated by the dotted slit 19. As long as the aircraft stays on this heading, the illuminated slit 19 appears to be stationary. Should the aircraft depart from this heading, the illuminated slit visually changes its angular position for example as indicated by the full line slit 12 in Fig. 3 thus giving directly and continuously an indication of the actual departure of the craft from its desired heading.

In order to energize the lamp 10 each time the loop 1 is passing through its null position, the signals from the receiver 5 are applied to the input of the keyer control 7. If desired, the receiver 5 may comprise the R. F. and I. F. stages of any well-known superheterodyne receiver. The I. F. signal from the receiver 5 is applied through transformer 20 (Fig. 2) to the full wave rectifier tube 21. The rectified voltage produces a voltage drop across resistor 22 which supplies a negative bias to the control grid 23 of amplifier 24, this bias being always of sufficient magnitude to substantially cut off the plate current of tube 24 or to maintain it below a predetermined maximum value, except when the loop 1 is passing through its null position. Consequently except during this null position, no voltage or a predetermined minimum voltage will be set up across resistor 25. The resistor 25 is connected across the control grid and cathode of amplifier tube 26 so that as long as no voltage or very little voltage is developed in resistor 25, the tube 26 passes plate current. The plate current of tube 26 therefore develops a corresponding voltage across resistor 27 which is connected across the control grid and cathode of tube 28. Tube 28 may be a high vacuum amplifier which is biassed to plate current cut-off by the drop across resistor 27. Consequently, as long as the loop 1 is out of its null position, tube 28 is blocked and no voltage is developed across the plate load resistor 29 and therefore the neon lamp 10 remains unlighted.

When the loop 1 is passing through its null position, i. e. when it is pointing towards the marker source of radiations, the reverse action takes place, that is, tube 24 passes plate current thus biassing tube 26 to plate current cut-off or substantially to plate current cut-off so that the grid of tube 28 is incapable of blocking action. Tube 28 therefore passes plate current resulting in the lighting of lamp 10. Since disc 11 is constantly rotating in time and phase synchronism with the loop 1, and at a speed within the period of persistence of human vision, even though the lamp 10 is lighted only momentarily, the slit 12 appears to be continuously lighted. Should the aircraft change its heading it results in an apparent movement of the lighted slit 12 clockwise or counterclockwise (Fig. 3) depending upon the departure of the craft from its original heading.

Where it is desired to determine position as well as heading, the flash indicator unit is provided with two lamps which are controlled in rapid succession by the signals received from two marker stations whose geographical locations are known. Such an arrangement is shown schematically in Fig. 4 of the drawings. In this figure, the loop antenna 1 and the non-directional antenna 2 are similar to those of Fig. 1, the loop 1 being driven continuously from motor 14 through suitable flexible shafting as indicated by the dotted line 30. The motor 14 also drives through flexible shafting 31, the slotted disc 32 of the double channel flash indicator unit 33 which disc is provided with a radial slit 34. Since the antennae 1 and 2 are to be tuned alternately to the two separate marker signals, each antenna has associated therewith two tuning devices, the tuning devices 35, 36 being used to tune the antenna 2 to the respective marker sources and the tuner devices 37, 38 being used to tune the loop 1 to the same sources. The channels 35—36 and 37—38 are arranged to be rendered alternately effective with their respective antennae by means of a pair of timed operating switches 39, 40. These switches may take the form of relay contacts operated by suitable motor or relay windings 41, 42, which are connected to a common source of potential and interrupter 43. Device 43 may consist of a continuously rotating potential reversing switch which is driven from the motor 14, whereby the relays 41 and 42 are simultaneously energized in one direction at predetermined spaced intervals, and in the opposite direction during the intervening intervals. If desired, the relays 41, 42, may be polarized relays so that during alternate intervals controlled by device 43, the relays are energized so that the respective tuners 35 and 37 are connected in circuit, while during the intervening alternate intervals, the potential to relays 41, 42 is reversed thus causing the respective tuners 36 and 38 to be connected in circuit. Each of the antenna channels is connected to the balancer and phaser units 44, 45, whereby the signals from the two antennae can be adjusted as to magnitude and phase so as to substantially completely balance each other out when the loop 1 is in its null position. The units 44 and 45 are connected to a suitable radio receiver having two separate radio frequency detector and oscillator channels 46, 47, each tuned respectively to one of the marker frequencies. The detectors 46 and 47 may be any well-known form of superheterodyne detectors and are arranged to produce respective intermediate frequencies corresponding to the marker sources. The intermediate frequencies are then fed to a common intermediate frequency amplifier 48 which in turn is connected to the keyer flashing control unit 49, the circuits of which are shown in detail in Fig. 5. The output of the keyer control 49 controls the illumination of a pair of gaseous discharge lamps 50, 51, in the flasher unit 33. The lamps 50 and 51 may be of any well-known gaseous discharge type, however in accordance with the invention, the lamps when energized are designed to produce illumination of different colors. Thus the lamp 50 may be of a neon-filled type for producing a substantially red glow when energized, whereas the lamp 51 may consist of an argon-filled lamp which produces a blue or bluish-white glow when energized. The lamps 50 and 51 are arranged to be connected alternately in circuit in synchronism with the operation of the switches 39 and 40, and this switching may be effected by a polarized relay 52 whose winding is energized from the same circuit that energizes the relays 41 and 42, consequently the movable contacts 53 of this relay operate in time and phase synchronism with the movable contacts 39 and 40.

The keyer control unit 49 includes a rectifier tube 54, a pair of high vacuum amplifier tubes 55, 56 and 57, together with resistances 58, 59, 60, 61, which function in the same manner as described hereinabove in connection with the keyer control 7 of Fig. 2. Consequently, when the movable switch contacts 39, 40 and 53 are in their uppermost positions the red lamp 50 is flashed at least 12 times per second under control of the antennae 1 and 2, this red lamp therefore corresponding to one of the marker sources. When the switch contacts 39, 40 and 53 are in their lowermost positions the blue lamp 51 is flashed at least 12 times per second under control of the signals received from the second marker station. The flasher unit 33 comprises a housing 34' within which the lamps 50 and 51 are mounted, and also mounted within the housing is the opaque circular disc 32 which is driven by the flexible shaft 31. Preferably the inner wall of the housing 34' is provided with a light reflecting surface so that the light from either of the lamps is substantially entirely reflected to the disc 32. Consequently as the disc 32 rotates in synchronism with the loop antenna 1, the slit 34 is alternately illuminated first by the red lamp 50 and then by the blue lamp 51 under control of the switches 39, 40 and 53. However, since each lamp is illuminated at least 12 times per second, the slit 34 appears to be illuminated substantially continuously and since there is a phase displacement between the null positions of loop antenna 1 corresponding respectively to the two marker sources, the disc 32 will apparently have two lighted slits which are alternately illuminated but which appear to remain lighted for an appreciable time because of the persistency of vision. The angular separation of these two illuminated radial lines is a direct indication of the heading of the aircraft with respect to the two marker sources. It will be understood of course that the interval timer 43 may be adjusted to alternate the switches 39, 40 and 53 several times per second or to provide only one alternation per several seconds. If it is set to produce one-second alternations, then the lights 50 and 51 will be alternately illuminated at one second intervals. However, if the device 43 produces 24 alternations per second, each of the lamps 50 and 51 will be illuminated at least 12 times per second and two illuminated slits will appear continuously lighted.

When the device is in operation and the tuners 35, 36 and 37, 38 are tuned respectively to the two marker frequencies, the red flash line which is visible through the disc 32 will indicate directly the orientation of the axis of the craft with respect to the first marker station and the other apparently illuminated blue line will indicate directly the orientation of the craft with respect to the other marker station. Consequently cross bearings of the craft with respect to both stations can be simultaneously obtained. By means of this cross bearing, the actual position of the craft can be easily determined by procedures well-known in the navigation art.

The device is also very useful in homing an aircraft while allowing for wind-drift. For example, assume that the aircraft is to follow a due north heading between two marker frequency sources which are also due north and south and let it be assumed that the wind is blowing from east to west requiring a 15 degree offset of the aircraft course from the due north and south course. If the nose of the aircraft is kept pointed due north, the craft will arrive somewhat considerably west of the north marker because of the wind-drift. In order to offset this, the nose of the aircraft must be pointed 15 degrees east of the north marker. Consequently if the north marker station is tuned in by devices 35 and 37 and the south marker station is tuned in by device 36 and 38, it will be found that the red and blue flash signals appear directly in line with each other but 180° apart as indicated by the numerals 65 and 66 (Fig. 6), but displaced 15° with respect to the north and south line on the scale. The movable scale 64 can then be rotated so that its zero mark is adjacent the flash illumination 65 while its 180° mark is adjacent the flash illumination 66. Consequently, if during flight the angle between the flash indication 65 and 66 decreases below 180°, it shows that the craft has drifted east of its due north course. Hence the nose of the craft is turned until the illumination 65 and 66 again appear 180° opposite to each other as shown in the drawings. Should a decrease in wind velocity or shift in wind occur, the angle between the flash indication 65 and 66 will increase giving a direct indication of the amount that the craft must be changed to compensate for this change in wind velocity.

While in the foregoing description reference has been made to two-channel devices, it will be understood that 3 or more channels may be employed, that is to say, 3 geographically separated marker-frequency sources may be employed and the antennae 1 and 2 will be provided each with 3 separate tuners and each with a 3 position switch so as to connect each set of tuners successively in circuit. In this event, the relays 39, 40 and 52 may be replaced by a commutator switch which connects the 3 channels repeatedly and alternately in circuit. Consequently, if the commutator operates at sufficiently high speed, there will appear on the disc 32, three separate flash indications representing the orientation of the aircraft with respect thereto and consequently by well-known principles of triangulation, the actual position of the aircraft is directly determinable.

Instead of employing plural channel tuners such as 35—36 or 37—38, and associated polarized relays 41, 42 and timer 43, well-known single channel automatically tunable devices may be employed. Likewise, instead of employing a plural channel R. F. detector oscillator 46, 47, a single channel automatically tunable detector-oscillator may be employed. By a single channel device is meant one which is capable of being tuned automatically but one at a time to a plurality of different wave lengths by means of push buttons or the like which are well-known in modern push-button radio receivers. Consequently the single channel device can be recurrently and automatically tuned to each of three or more known marker frequencies. Thus the device 35—36 may be replaced by a variable tuned circuit which can be controlled by push-buttons which are operated automatically at regularly recurrent intervals. Likewise the devices 46, 47, may be replaced by a tunable R. F. detector oscillator which can be tuned to the same marker frequencies by means of appropriate push buttons automatically operated at regularly recurrent intervals. In the case of three marker frequencies the housing 34 (Fig. 7) will contain three lamps each of which corresponds to a different tuned-in marker frequency. One lamp when energized may produce red indications, another lamp blue and the third lamp may produce white. By means of these three substantially simultaneous flash indications, it is possible to use one of them for cross bearings in conjunction with the movable scale 64 (Fig. 6) to determine by interpolation or on a suitably prepared chart either latitude or longitude, or the mileage east or west of a predetermined course as will be obvious to those familiar with the navigation art.

Referring to Fig. 8, there is shown a slightly modified form of keyer control except that the flash lamp 10 instead of being controlled by a high vacuum-tube amplifier 28, is controlled by a grid-controlled gaseous tube 28a of the thyratron type. The elements 20 to 27 are the same as the corresponding elements of Fig. 2. When the pick-up loop is in its null position, there will be no signal impressed across transformer 20; hence tube 24 will draw plate current and bias tube 26 to plate current cutoff; as control grid of tube 29c is connected to the control grid of tube 26, tube 29c will also be biased to plate current cutoff. There will be no bias on the control grid of thyratron tube 28a, hence there will be a plate current discharge through it causing lamp 10 to glow. When the loop pickup has passed its null position a signal will be impressed across transformer 20 and the action of the keyer will be reversed, i. e., no plate current through tube 24 hence no bias to grids of tubes 26 and 29c hence plate current through tubes 26 and 29c. The plate current through tube 29c will increase the voltage drop across resistor 29b, decreasing the potential applied to the plate of the thyratron 28a to a point where the discharge will cease. As the control grid of the thyratron now has a high value of negative bias impressed across it, the thyratron is restored to its grid control and will not break down again until the loop reaches its null position again when all biases will be reversed and the discharge cycle repeated.

In the foregoing, the apparent simultaneous appearance of two or more flash lines on the flash indicator is dependent substantially entirely on the retentivity of vision. If however it is desired to rotate the pick-up loop at a lower rate or if it is desired to employ three channels without the necessity of switching the channels in at a very high rate of speed or of tuning the receiver to the respective channels at a very high rate of speed, it is possible to employ a special phosphorescent viewing screen in conjunction with the device 8 (Fig. 1) or device 33 (Figs. 4 and 5). This screen is provided with a phosphorescent coating which retains its illumination for a short interval after it is excited by the corresponding light flash through the slot in the rotating disc of the flash indicator. Thus if three marker channels are employed to give cross bearings from three different marker sources, the pick-up loop may rotate at 12 revolutions per second and the switching devices such as devices 41, 42 (Fig. 4) can be energized in timed relation to the loop rotation so that during the first rotation of the loop the keyer control 49 will be controlled by one marker source; during the next rotation of the loop the device 49 will be controlled by the second marker source; and during the third rotation device 49 will be controlled by the third marker source, and so on recurrently. This control of the device 49 will be effected as above described either by switching in the respective marker tuning channels or by successively tuning a single radio receiver to the respective marker channel frequencies. Consequently, the three flash lamps will be lighted cyclically each 4 times a second. However, in order to give the effect of persistent illumination of the three lines of light, there is positioned above the disc 11 (Fig. 3) or disc 32 (Figs. 4 and 5), a thin glass cover plate or screen having a coating of phosphorescent material so that the said cover plate is normally non-transparent to light but when the phosphorescent material is illuminated by the light flash through the slit 12 or the slit 34, the illumination appears to continue even during the interval that the corresponding light flash is extinguished. Thus the phosphorescent coating may be of any well-known composition which retains its illumination for approximately one-quarter of a second after its exciting light has become extinguished. Thus in the example given above with the loop rotating 12 revolutions per second, the phosphorescent coating will persist for one-quarter of a second after each excitation, hence there will be created the illusion of three separate constant and simultaneous cross bearing indications upon the face of the flash indicator. Since the disc 11 or disc 32 is rotated in time and angular synchronism with the loop, the three apparently simultaneous flash lines will change their relative angular positions as the craft changes with respect to the three marker sources.

While certain specific embodiments and types of apparatus are disclosed herein, it will be understood that various changes and modifications may be made without departing from the spirit and scope of the invention.

What I claim is:

1. In a radio guiding system, a directionally sensitive antenna system including a rotating loop, a radio receiving system connected to said antenna system, means effective at regularly recurrent intervals to tune said receiving system alternately to a plurality of known marker frequencies, a plurality of light sources illuminated alternately under control of said receiving system, a light shutter for said light sources, and means to rotate said shutter and said loop in synchronism at a rate within the persistency of vision.

2. A system according to claim 1 in which the means to tune said receiving system includes a plurality of sets of antenna tuners, a plurality of switches for connecting said tuners alternately in circuit with the antenna system, and a timing device for operating said switches at regularly recurrent intervals.

3. In a radio guiding system, a rotatable loop antenna, a non-directional antenna cooperating with said loop antenna to produce a null indication when said loop antenna is facing a distant marker source, a plurality of sets of antenna tuners one set for each antenna, a plurality of switches one for each antenna for alternately connecting corresponding tuners of each set of tuners in circuit with the associated antenna, means to balance the signals from the antennae to produce the said null, a plurality of gaseous discharge lamps one for each of said sets of tuners, a rotatable light shutter for said lamps, a lamp switch for alternately connecting said lamps in circuit with said tuners, and a timing device for operating all said switches simultaneously.

4. A system according to claim 3 in which said switches are in the form of polarized relays whose operation is automatically controlled by a constantly operating timing device.

PHILIP BERNSTEIN.